United States Patent
Kim et al.

(10) Patent No.: US 6,522,260 B1
(45) Date of Patent: Feb. 18, 2003

(54) PORTABLE PANEL POSITION DETECTOR

(75) Inventors: Sooho Kim, Troy, MI (US); David W. Poma, Fraser, MI (US); George L. Kilbertus, Washington, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/898,765

(22) Filed: Jan. 30, 2001

(51) Int. Cl.[7] .............................................. G08B 21/00
(52) U.S. Cl. .................... 340/686.5; 340/673; 340/675; 340/676
(58) Field of Search ................................ 340/673, 674, 340/675, 676, 686.1, 686.2, 686.5, 690

(56) References Cited

U.S. PATENT DOCUMENTS

| | | | | |
|---|---|---|---|---|
| 3,566,060 A | * | 2/1971 | Phillips | 200/83 |
| 3,701,356 A | * | 10/1972 | Hanna et al. | 134/58 R |
| 4,725,700 A | * | 2/1988 | Zoludow | 200/81.9 |
| 4,930,213 A | * | 6/1990 | Hayakawa et al. | 29/793 |
| 5,337,881 A | * | 8/1994 | Kakida et al. | 498/409 |
| 5,699,161 A | * | 12/1997 | Woodworth | 356/379 |
| 5,791,400 A | * | 8/1998 | Brzytwa et al. | 165/8 |
| 5,960,564 A | * | 10/1999 | McElroy et al. | 34/666 |
| 6,052,627 A | * | 4/2000 | Nakamura | 700/182 |
| 6,147,625 A | * | 11/2000 | Decker | 340/933 |
| 6,192,732 B1 | * | 2/2001 | Kojima | 72/389.5 |

* cited by examiner

*Primary Examiner*—Daniel J. Wu
*Assistant Examiner*—Phung T Nguyen
(74) *Attorney, Agent, or Firm*—Kathryn A. Marra

(57) ABSTRACT

A portable panel position detector for determining the orientation of panels being serially moved on a transfer line into a downstream panel treatment facility comprising a pair of support towers laterally spaced to allow the passage of line supported panels therethrough. The spaced support towers operatively mount elongated and vertically extending sensor strips in opposing spaced relationship that defines clearance-determining gating between the towers. In the event a panel moving through the restricted gate is not properly orientated on the transfer line, at least one sensor strip or a portion thereof will be deflected by physical contact with the panel moving therethrough. The displaced strip effects the triggering of an alarm that advises a transfer line attendant that the panel is improperly loaded. The panel can be appropriately repositioned on the transfer line so that it can successfully pass through the treatment facility without damage.

6 Claims, 3 Drawing Sheets

PORTABLE PANEL POSITION DETECTOR

TECHNICAL FIELD

This invention relates to a detection system which detects the orientation of articles such as automotive body panels as loaded and positioned onto hanger racks of a conveyer which subsequently moves the articles through a treatment facility to prevent damage to the facility or articles by physical contact therebetween.

BACKGROUND OF THE INVENTION

Prior to the present invention, panels and other components for automobiles bodies have been produced by equipment such as forming dies operatively mounted in a press. These components are generally mass-produced and put on transfer lines and serially transmitted through cleaning stations or other facilities for addition treatment. For example, body panels may be formed from metal sheet stock in a forming die procedure and then removed from the dies and loaded on a transfer line and moved through a wash station where foreign substances such as lubricants are removed from the panels. After leaving the wash station, the panels can be further handled and worked for eventual use as an automotive body part.

SUMMARY OF THE INVENTION

In the present invention, a portable panel position detector is positioned at a selected station along the transfer line and between a panel production facility and a downstream panel treatment station. The detector in one preferred embodiment of this invention has a base formed with a lower guide way that guides line transfer hangers with panels loaded thereon through gating operatively supported by a pair of upright towers. The gating incorporates a pair of opposing and vertically extending panel position sensor or detection strips. The sensor strips define clearance space therebetween that is substantially equal to the minimum clearance needed by the panel to go through the treatment station. The strips are pivotally supported on the towers and movable by contact with a panel improperly positioned on a hanger to an alarm triggering position. A line attendant reacting to the alarm can correctly reposition the panel on the hanger so that it can readily go through the station. A panel successfully negotiating the detection clearance space can successfully negotiate and be treated by the downstream treatment station without damage.

Accordingly, it is an object of this invention to provide a new and improved panel detector for a panel transfer line so that panels improperly oriented on the transfer line will physically contact at least one pair of sensor strips defining a predetermined clearance effecting the deflection thereof which triggers signals advising of the panel misorientation so that it can be repositioned on the line for successful treatment by a downstream panel treatment facility.

Another object of this invention is to provide a new and improved article position detector which reduces or eliminates the transfer of improperly hung articles through an article treatment station where damage to the articles and components of the facility could otherwise occur because of physical contact between the panels and components of the treatment facility.

Still another object of the invention to provide a new and improved panel position detector which provides for damage avoidance to panels when transmitted through a panel treatment station. The detector is portable and self-contained with a battery-energized alarm system carried thereon.

These and other objects, features and advantages of this invention will become more apparent from the following detailed description and drawings in which:

DESCRIPTION OF THE PREFERRED EMBODIMENT

Figure 1:
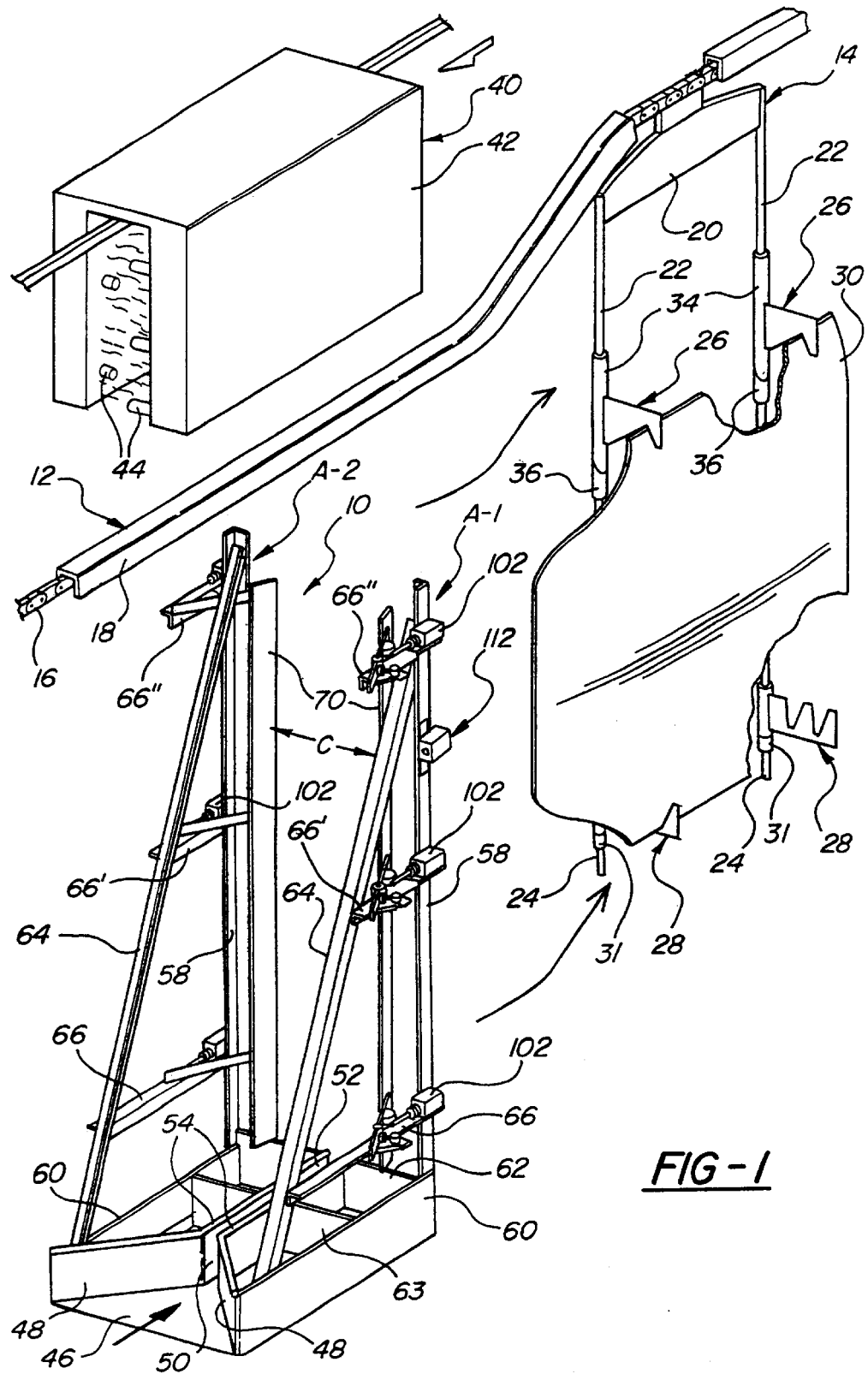
FIG. 1 is a pictorial view of the panel position detector positioned along an article transfer line that leads through a panel treatment station.

Turning now in detail to the drawings, there is shown in FIG. 1 a portable part position detector 10 located in operative alignment with an overhead part transfer line 12. The line has hangers 14, which operatively attach to a powered chain or cable 16 movable through an overhead stationary guide 18. Each hanger comprises an upper elongated support plate 20 operatively attached to the chain and oriented in alignment therewith. The support plates 20 have vertically suspended support rods 22 depending therefrom which terminate in cylindrical guide end portion 24 that are guided through the part position detector as described hereinafter.

Each of the support rods 22 has upper and lower panel support jaws 26, 28 for supporting automotive body panel 30 thereon. As shown in FIG. 1, the lower jaw 28 includes an extending support plate with an inboard sleeve which slidably receives the support rod 22. Stops 31 fixed to the rods 22 adjacent to guide end portions 24 establish the lower position of the bottom or lower jaws 28. The lower jaws are formed with a plurality of V-shaped panel retainer notches in the jaw plate thereof, either of which may receive the lower or bottom edge of the panel. Multiple V notches are used to accept various size and shaped panels for support and transfer through the wash station.

The upper support jaw 26 is generally similar in construction to the lower jaw. The upper jaw 26 has a flattened upper jaw plate, which extends from an inboard sleeve 34, which slidably receives the associated support rod 22. Stops 36 fixed to the support rod and below sleeve 34 establish the limit of travel of the upper jaw toward the lower jaw. The upper jaw plate is formed with at least one downwardly-extending V-notch therein for operatively engaging and retaining the top edge of the automotive body panel 30.

The body panel 30 is loaded onto the hanger 14 by engaging the upper edge thereof with the V-notches in the plate of the upper jaws 26 and displacing the upper jaws on the associated support rods 22 until the lower jaws are cleared by the lower edge of the panel. After alignment with the appropriate V-notches in the lower jaws, the panel 30 is simply lowered so that the lower edge engages the selected V-shaped retainer notch. The upper jaws maintain engagement with the upper edge of the panel and follow the lowering of the panel 30 by force of gravity. The panel is accordingly gripped in a proper vertical orientation by the hangers for subsequent transfer through the washing station 40.

However, in the event that the panel is misarranged on the carrier (such as being placed cross-wise in the notches of the lower jaws, for example), it may project therefrom to interfere with its transfer through the wash station and be damaged by such interference. Accordingly, the panel position detector 10 can be employed at any selected position along the transfer line where it can detect misoriented panels being transferred through a downstream treatment facility 40.

The chain 16 of the transfer line 12 carries the hangers 14 past a part production facility where the panels are serially loaded thereon and then sent through the part position detector 10 and subsequently through the part treatment station 40, such as a panel washing station. The station is defined by an enclosure or housing 42 which has a plurality of spray nozzles 44 mounted on the opposing internal walls thereof that direct pressurized sprays of cleaning fluid on the panels as they pass through the confines of the housing to clean the panels of foreign materials including lubricants that are employed in the manufacture of the panels.

The lateral space or clearance between opposing spray nozzles 44 is limited, and unless the panels are carefully positioned in appropriate orientation on the hangers 14, the nozzles may contact the panels as they are being transferred therethrough. This contact can cause damage to the panels, nozzles, transfer equipment or other associated components, resulting in scraped parts and downtime of the line for repair. Such scrappage and downtime is costly and inefficient, particularly where mass production lines are employed to effectively move panels from a forming station to a cleaned and finished panel delivery station as rapidly as practical.

Accordingly, the panel position detector 10 is designed to quickly and accurately advise line attendants as to the alignment or orientation of the panels being transferred by the transfer line and in particular with respect to the clearance space existing between the opposing spray nozzles 44 in the wash station 40.

In one preferred embodiment of this invention, the part position detector 10 is a portable unit that can be positioned in any selected location along the transfer line 12. The detector 10 comprises a flattened support base plate 46 of metal to which upstanding forward hanger guide walls 48 are welded or otherwise attached. As shown in FIG. 1, the guide walls 48 are configured as a weir or funnel leading into a centralized entrance 50 that leads into an elongated lower and straight guide way 52 formed between laterally-spaced interior walls 54 that receives and guides the lower ends 24 of the hangers 14 as they pass through the detector. The lower guideway may be dimensioned and designed to duplicate the lower guideway of the entrance of the wash station. The detector 10 further comprises a pair of laterally-spaced uprights 58 of angle iron or other suitable material securely fastened at their lower ends to the upstanding peripheral side and end walls 60, 62 of the base. Internal support or reinforcing walls 63 operatively extend between walls 60 and 54 as desired.

The uprights 58 are further supported by a pair of elongated and angled braces 64, each of which angularly extends from connection with an upper portion of the associated upright 58 to the connection with the aligned peripheral side wall 60 of the base as shown in FIG. 1.

Figure 2:
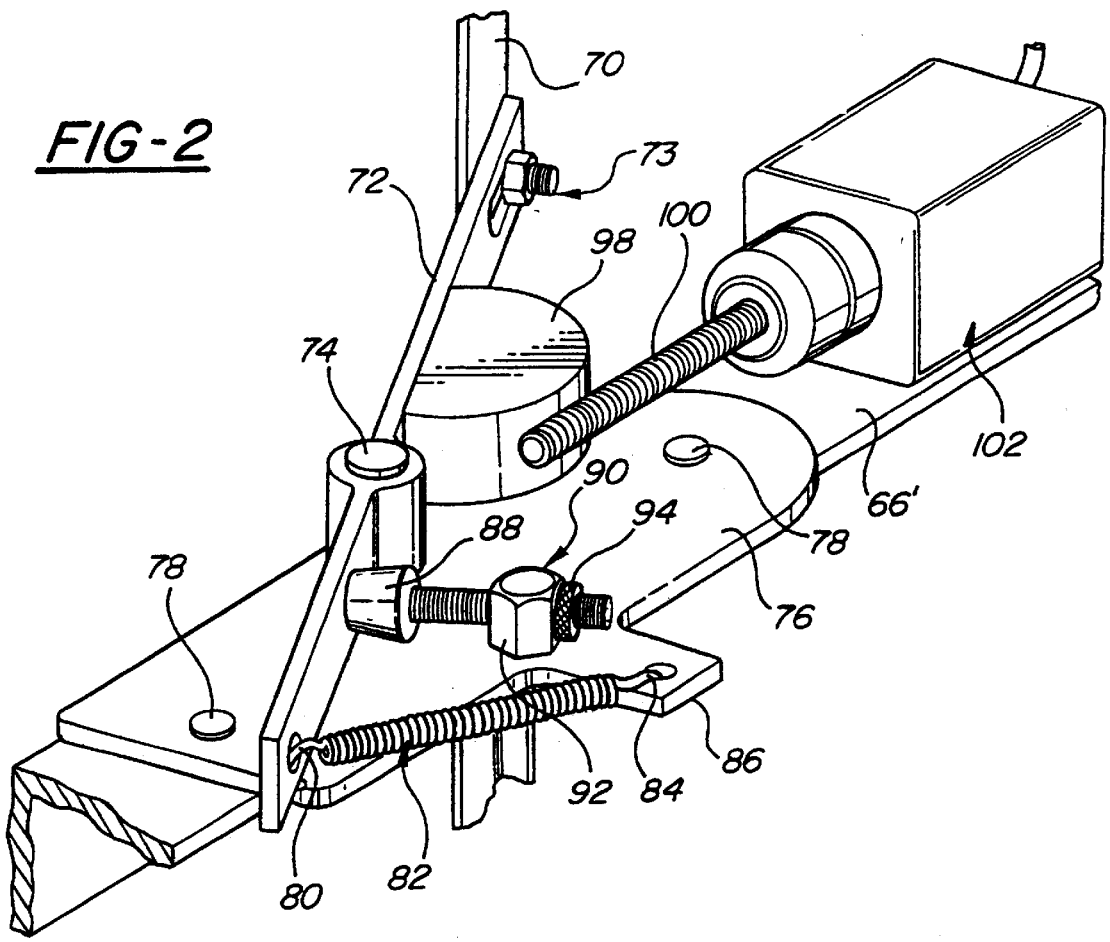
FIG. 2 is an enlarged pictorial view of a portion of the detector of FIG. 1 illustrating panel position-detecting parts thereof.
Figure 3:
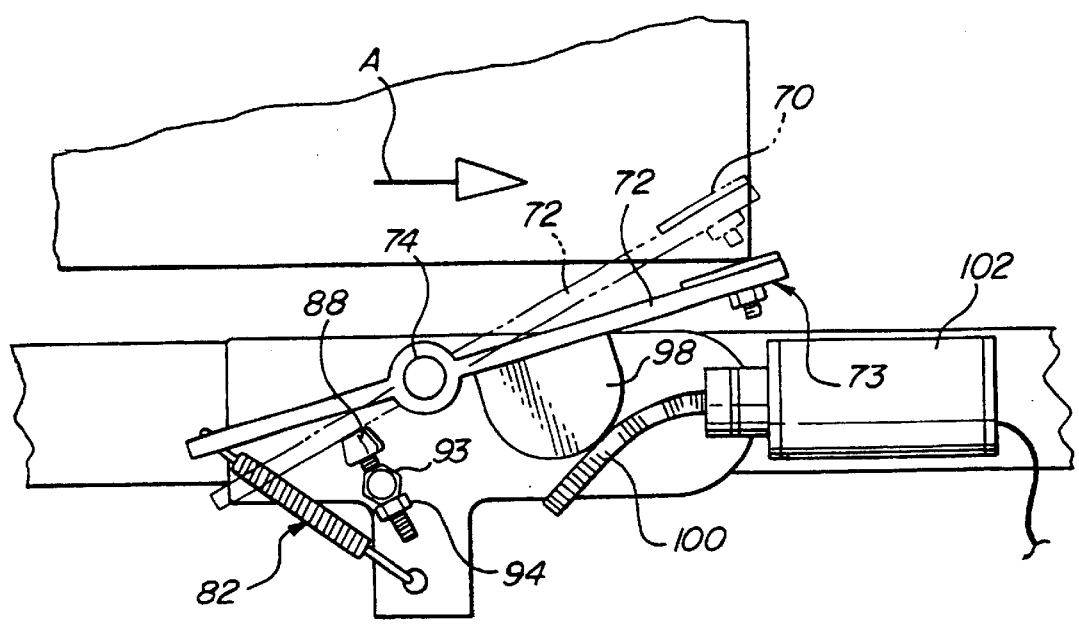
FIG. 3 is a top view of the parts of FIG. 2 being actuated by a misorientated panel moving through the position detector.

Horizontally-extending and vertically-spaced support members 66, 66' and 66" extend from attachment with each of the uprights 58 to attachment with the associated angled brace 64 as illustrated in FIGS. 1–3. This construction accordingly provides two laterally-spaced and upright support tower structures A-1 and A-2 that are substantially identical and flank the centralized guide way 52. The space between the towers is restricted by a pair of laterally-spaced and elongated panel contact or sensor strips 70 that extend vertically and are secured on the outboard end of swing arms 72. These strips are adjustably mounted on the swing arms by bolt and slot connections 73 so that the clearance "c" can be readily adjusted to suit various sized panels and treatment stations. Preferably, the strips 70 are made from a thin resilient metal material, but other material can be employed as desired. The swing arms 72 are in turn pivotally supported by vertical pivots 74 extending upwardly from base plate 76 secured by fasteners 78 to an associated horizontal support member 66, 66' or 66".

The outboard end of each of the swing arms 72 is provided with an opening 80 which receives an end hook of a helical coil spring 82 that also has its other end formed with a hook 84 which is received in an opening in the outboard end of an arm 86 extending laterally from the main body of the base plate 76.

The spring 82 normally contracts to turn the swing arms 72 on pivots 74 to a stop position against the head 88 of an adjustable stop 90. This stop comprises an adjustable shank that threads through the head 92 of a vertically-extending attachment bolt 93 secured to the base plate 76. A knurled nut 94 threaded on the end of the shank holds the shank in an adjusted position to establish the position of stop head 88 and thereby the position of vertically-extending sensor strips 70 and the clearance "c" between the two sensor strips supported by towers A-1 and A-2.

As shown best in FIGS. 2 and 3, each of the swing arms 72 carries a protruding contact 98 on the outboard side thereof located between the pivot 74 and the associated sensor strip 70. The contact is adapted to engage an elongated switch arm 100 here provided by a flexible coiled member operatively extending from the body of an electric switch 102 fastened to the associated support member 66, 66' and 66" of the associated tower A-1 or A-2.

Figure 4:
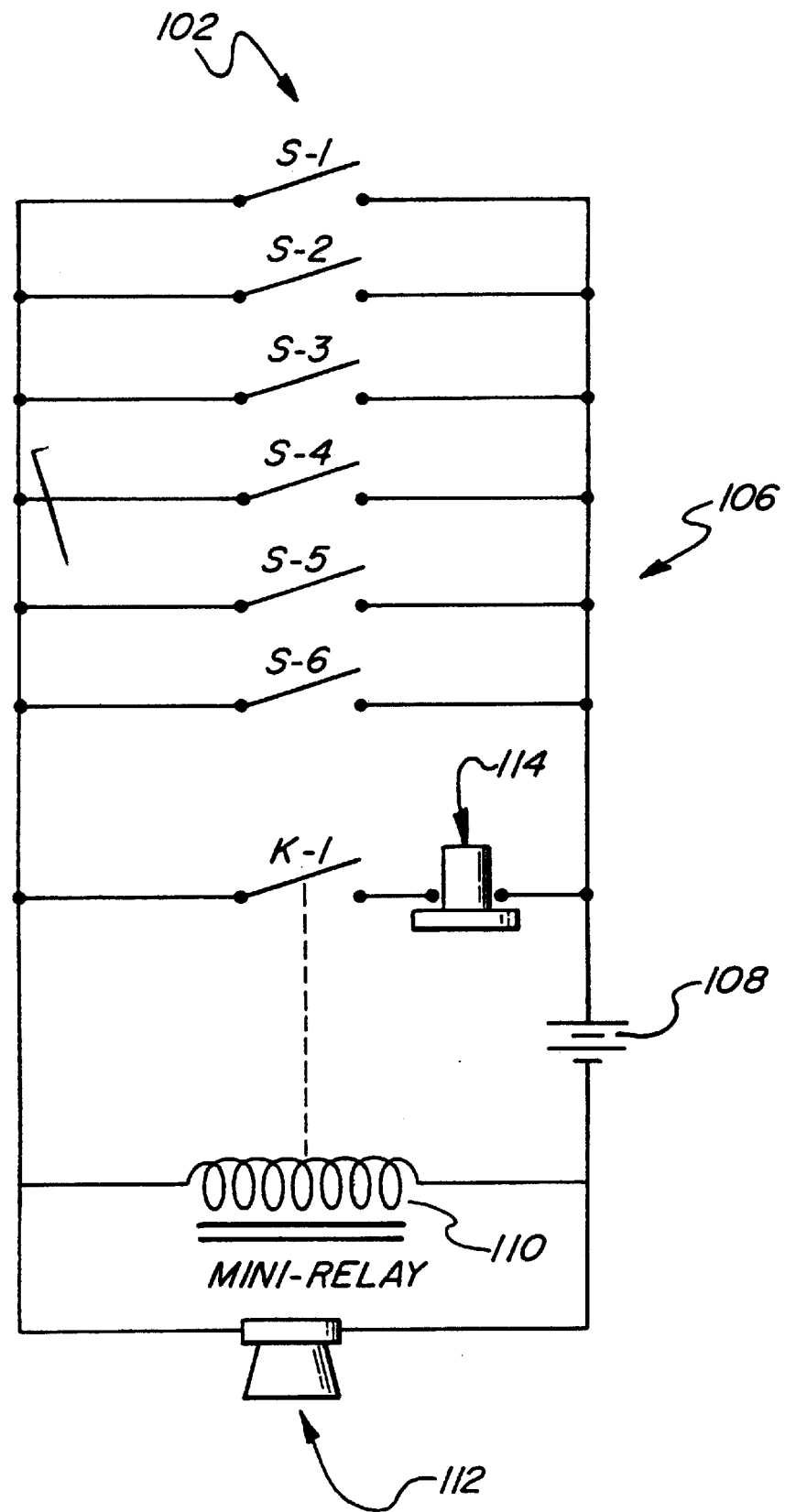
FIG. 4 is a circuit diagram utilized with the position detector constructions of FIGS. 1, 2 and 3.

When the switch arm 100 is displaced by the contact 98 in response to a panel 30 going through the pivotal gating provided by the strips 70 (see directional arrow A in FIG. 3), one or more of the switches will close to complete a circuit 106 shown in FIG. 4 that is energized by battery 108. The circuit 106 including the six illustrated switches S-1 through S-6 (each corresponding to switch 102) and the battery 108 are entirely supported on the detector 10 and thereby form a part thereof to provide a self-contained unit which can be positioned along the transfer line. When the circuit 106 is completed, the relay is energized to effect closure of the relay coil 110 switch K-1 in parallel with the relay coil 110. On closure of the relay switch K-1, the relay circuit is completed to effect the sounding of speaker or buzzer 112 in the relay circuitry. This audible signal notifies a line attendant that a panel is out of position on hangers 14 and repositioning is required before the panel 30 can be successfully sent through the wash station 40 without physically contacting the spray nozzles.

After panels 30 pass between the sensor or detection strips in a manner that one on them displaces the strips to turn the associated swing arm or arms to sound the buzzer, springs 82 contract to swing the arms 72 against stop 88. This again establishes the allowable clearance "c" between the sensor strips needed for successful panel transfer through the wash station. The relay circuit, however, remains energized until the reset button 114 is depressed to break the relay circuit and de-energize the relay coil 110. When relay coil 110 is de-energized, relay switch K-1 is moved to an open position by a spring or other mechanism not shown. The horn or buzzer, of course, terminates sounding of the audible signal so that the panel position indicator is again set to determine the position of panels being transferred therethrough by transfer line 12.

It is readily apparent that the above-described constructions have potential for wide commercial utility. It should therefore be understood that the specific form of the invention hereinabove described is intended to be representative only, as other modifications within the scope of these teachings will be apparent to those skilled in the art. Accordingly, reference should be made to the following claims setting forth the scope of the invention.

What is claimed is:

1. A detector for determining the position of articles mounted on article support structures having free lower end portions and having upper end portions fixedly secured on a movable transfer line for movement through said detector into an article treatment station having article treatment mechanism therein defining a clearance sufficient to accommodative articles moving on said line through said station if the articles are mounted in a predetermined orientation on said support structures comprising a stationary base having a lower guideway for actively receiving the lower end portions of said article support structures and actively guiding said article support structures in their movement through said detector, a pair of laterally spaced uprights secured to said base and disposed on opposing sides of said guideway, displaceable article detection members operatively mounted on each of said uprights and having a first position defining a clearance space therebetween equal to the defined clearance in said article treatment station, a signaling unit carried by said detector, a support and signaling unit activating structure for each of said article detection members responding movement of said detection members from said first position by physical contact with an article being moved on said transfer line, to activate said signaling unit and resultantly provide a signal to indicate movement of said detection members from said first position.

2. They detector of claim 1 above wherein said detection members are elongated sensor strips and wherein each of said support and signaling unit activation structures for said sensor strips are swing arms pivotally mounted with respect to said uprights and further wherein said signaling unit includes an electrically operated sounding unit operatively disposed in an electrically powered circuit carried by said detector.

3. A position detector for an article releasably supported on and transported by an article transmitting device into an article receiving station having limiting structure defining acceptable spatial limits for said article comprising laterally spaced support structures defining a gateway for accommodating the passage of said article therethrough, at least one of said support structures having an elongated article contact member operatively mounted thereon, pivotally movable swing arm structure operatively associated with respect to one of said spaced support structures for adjustably and pivotally supporting the article contact member at a predetermined gauging position between said support structures to limit the free passage defined by said gateway, an alarm operatively secured with respect to said support structures, said swing am structure being moved by the physical engagement of said contact member with an article passing through said gate way to a position whereby said alarm is triggered to indicate the article has been improperly positioned on said article transmitting device.

4. The detector of claim 3 wherein said swing arm structure is movably supported in a predetermined gauging position by a spring holding said swing arm against an adjustable stop that determines the position of said article contact member.

5. A portable panel position detector comprising a stationary base, a lower guide associated with said base for guiding a part transmitting carrier with removably mounted parts thereon through the detector, said base having a pair of laterally spaced uprights supported thereon, each of said uprights having an article sensor strip associated therewith, as stationary support extending from each of said uprights, a sensor strip support arm secured to each said sensor strip and pivotally mounted on said support, an electrically operated alarm for said detector, a switch for each of said strips supported on said staionary support associated therewith, said sensor strip support arm being operable to trigger said switch and activate said alarm so that said part can be properly positioned on said part transmitting carrier and be guided through said detector without triggering said alarm.

6. A detector for determining the position of articles mounted on a plurality of serially arranged article support structures each having free lower end portions and having upper end portions operatively secured on a movable transfer line for article position recognition and movement through said detector and subsequently into an article treatment station having article treatment mechanism therein that define a clearance sufficient to accommodate and allow treatment of articles moving on said line into said station if the articles are in a predetermined orientation on said article support structures, the detector comprsing a stationary lower base having a lower guideway for actively receiving, aligning and guiding the free lower end portions of said article support structures and in their movement through said detector, a pair of laterally spaced uprights secured to said base and disposed on opposite side of said guideway, displaceable article detection members pivotally mounted for swinging movement with respect to each of uprights and operatively disposed in a first relative position defining a clearance space that spatially corresponds to the defined clearance in said article treatment station so that any article passing therethrough free of contact with any of said article detection members can be moved into the clearance space in the article treatment station without contact with the article treatment mechanisms therein, a signaling unit carried by said detector, a pivotally mounted support and signaling unit activating structure for each of said article detection members and pivotally movable by said article detection members from said first relative position by physical contact with an article being moved on said transfer line to activate said signaling unit and resultantly provide a signal to indicate movement of at least one of said detection members from said first relative position.

* * * * *